(12) United States Patent
Satoh

(10) Patent No.: US 7,293,274 B2
(45) Date of Patent: Nov. 6, 2007

(54) DISK PLAYER

(75) Inventor: Katsuhisa Satoh, Tokyo (JP)

(73) Assignee: Clarion Co., Ltd., Tokyo (JP)

( * ) Notice: Subject to any disclaimer, the term of this patent is extended or adjusted under 35 U.S.C. 154(b) by 218 days.

(21) Appl. No.: 10/296,049

(22) PCT Filed: May 21, 2001

(86) PCT No.: PCT/JP01/04208

§ 371 (c)(1),
(2), (4) Date: Nov. 21, 2002

(87) PCT Pub. No.: WO01/91119

PCT Pub. Date: Nov. 29, 2001

(65) Prior Publication Data

US 2003/0107975 A1    Jun. 12, 2003

(30) Foreign Application Priority Data

May 22, 2000    (JP) .............................. 2000-149704

(51) Int. Cl.
*G11B 3/70* (2006.01)
(52) U.S. Cl. .................................................. 720/707
(58) Field of Classification Search ................ 720/706, 720/707, 622, 623, 702
See application file for complete search history.

(56) References Cited

U.S. PATENT DOCUMENTS 5,321,687 A * 6/1994 Kinoshita et al. ........... 720/621
6,147,948 A 11/2000 Tanaka et al.
6,577,586 B1 * 6/2003 Yang et al. ................. 720/707
2004/0017767 A1 * 1/2004 Niikura et al. ............. 369/270

FOREIGN PATENT DOCUMENTS

| JP | 02-042675 | | 2/1990 |
|---|---|---|---|
| JP | 05-298800 | | 11/1993 |
| JP | 06-44660 | | 2/1994 |
| JP | 09-237455 | | 9/1997 |
| JP | 11-086401 | * | 3/1999 |
| JP | 11-86401 | | 3/1999 |
| JP | 2000-90531 | | 3/2000 |

OTHER PUBLICATIONS

European Search Report dated Aug. 25, 2005.

* cited by examiner

*Primary Examiner*—Hoa T. Nguyen
*Assistant Examiner*—Mark Blouin
(74) *Attorney, Agent, or Firm*—McGinn IP Law Group, PLLC

(57) ABSTRACT

A disc player 10 which moves a disc stopper 55 controlling the movement of a drawn disc 1 and clamps and chucks the disc on a turntable, wherein the disc stopper is designed so that is it positioned in a positioning position where the disc and the turntable are positioned concentric with each other and in a retracted position where the disc stopper is spaced from the disc clamped and chucked to a turntable.

17 Claims, 9 Drawing Sheets

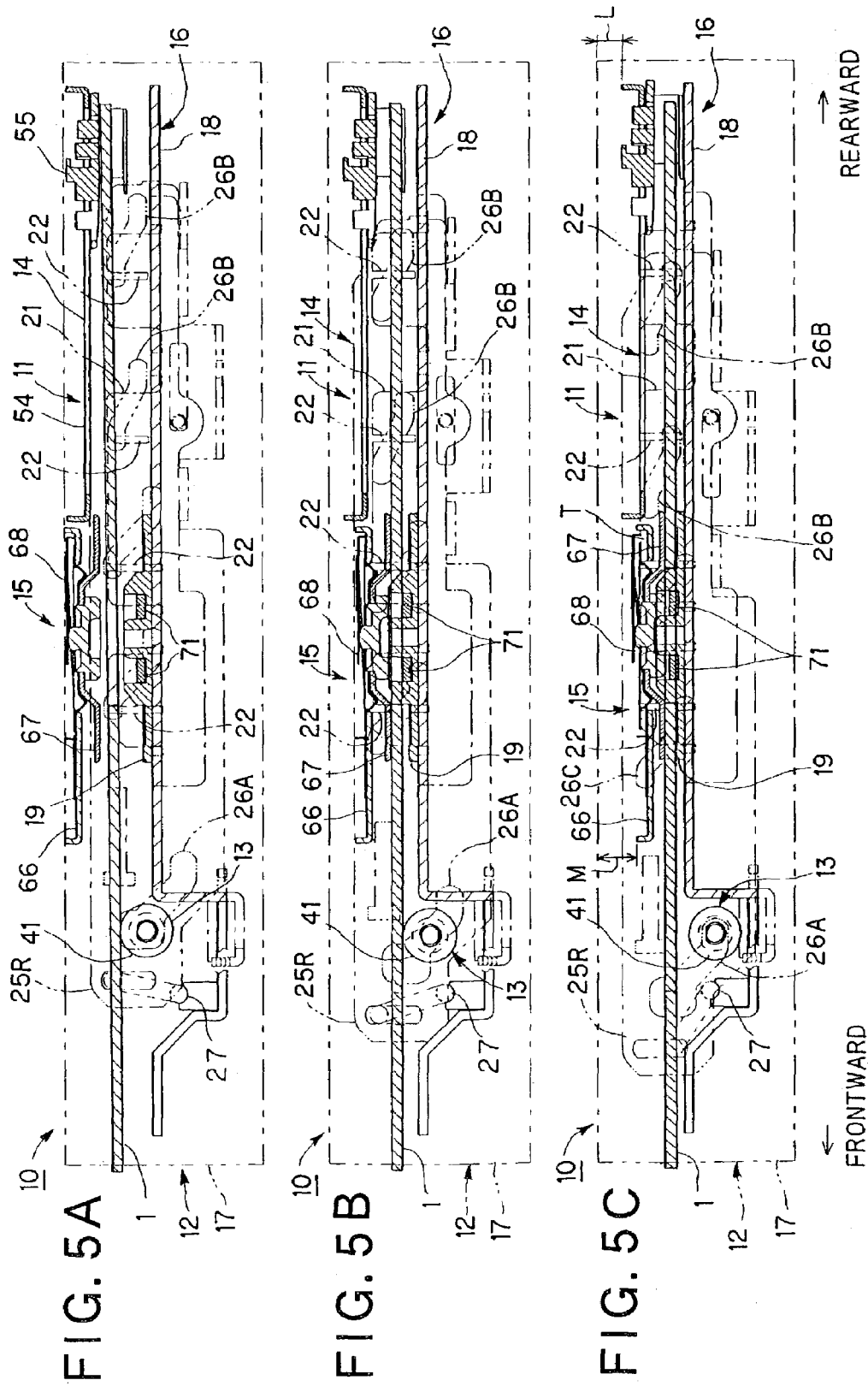

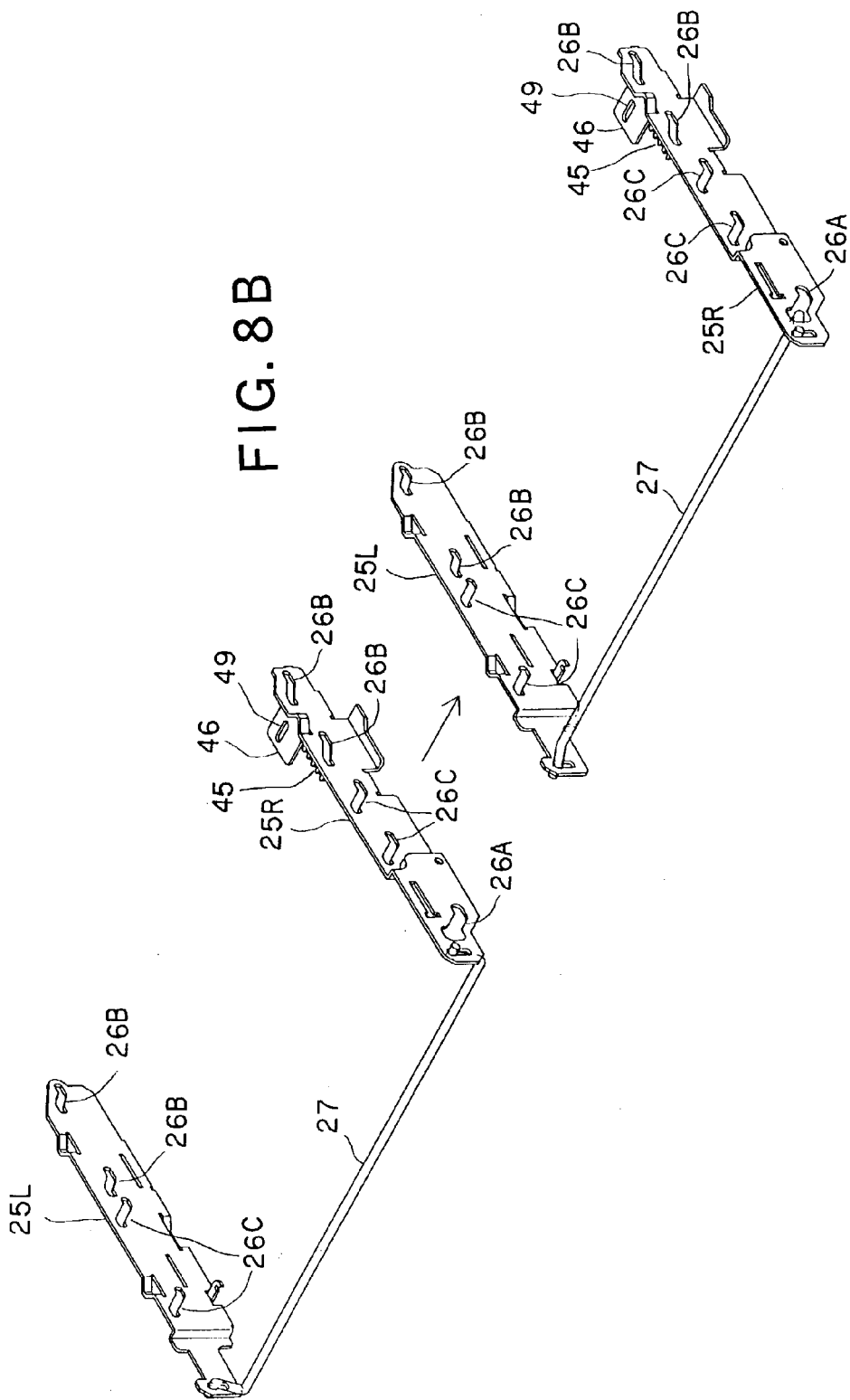

ium disc such as CD (Compact Disc) or the
DISK PLAYER

TECHNICAL FIELD

The present invention relates to a disc player which is mounted in a vehicle and reproduces information on a recording medium disc such as CD (Compact Disc) or the like.

In a conventional disc player such as a CD player or the like which is mounted in a vehicle, when a disc stopper for regulating the position of a disc drawn into a player body is moved to damp and chuck the disc onto a turntable, the disc stopper is moved from an initial position to a retracted position and the disc is subjected to centering at this retracted position.

The retracted position of the disc stopper is the position at which the disc stopper is spaced from the disc when the disc is clamped on the turntable. The centering is carried out by engagedly fitting the center hole of the disc to the taper portion of the turntable and making the respective centers of the disc and the turntable coincident with each other by the action of the taper portion through free fall of the disc.

However, the centering of the disc in the disc player as described above needs to set the height dimension of the taper portion of the turntable to a sufficient value in order to enhance the centering precision of the disc. Therefore, the height of the turntable cannot be set to a low value, and thus it has been impossible to make the disc player thin.

The present invention has been implemented in view of the foregoing situation, and has an object to provide a disc player which can enhance the centering precision of a disc and can be designed to be thin.

SUMMARY OF THE INVENTION

According to the present invention, a disc player in which a disc stopper for regulating the movement of a drawn disc is moved to clamp and chuck the disc on a turntable is characterized in that the disc stopper is designed so that the disc stopper is positioned to a positioning position where the disc and the turntable are positioned to be concentric with each other and to a retracted position where the disc stopper is spaced from the disc clamped and chucked to the turntable.

Further, in the above invention, the disc stopper is forcedly moved from the positioning position to the retracted position after the disc is clamped and chucked to the turntable.

Still further, in the above invention, the disc stopper is mounted at one end of a rotatable G plate, the other end of the G plate is fitted to a sensor arm which is varied in engaging position in accordance with each of plural kinds of discs different in diameter, and after the disc is clamped and chucked onto the turntable at the positioning position of the disc stopper, the G plate is minutely rotated by a minute movement of the sensor arm to position the disc stopper to the retracted position.

Still further, in the present invention, the movement of the disc stopper due to the drawing of the disc and the clamping of the disc onto the turntable are performed by the driving force of a motor, and the driving force of the motor is transmitted to the sensor arm through an S arm stopper after the disc is clamped onto turntable, so that the sensor arm is minutely moved.

According to the present invention, the disc stopper for regulating the movement of the disc drawn is positioned to the positioning position at which the centers of the disc and the turntable are coincident with each other, and the retracted position at which the disc stopper is spaced from the disc clamped and chucked to the turntable. Therefore, the centering precision of the disc to the turntable can be enhanced by clamping and chucking the disc to the turntable at the disc stopper positioning position.

According to the present invention, the disc is clamped and chucked to the turntable at the positioning position of the disc stopper, and thus there can be shortened the height dimension of the taper which is formed in the height direction of the turntable, engagedly fitted to the center hole of the disc and makes the centers of the disc and the turntable coincident with each other through the engagement process. As a result, the height of the turntable can be lowered, so that the disc player can be designed to be thin.

BRIEF DESCRIPTION OF THE DRAWINGS

FIGS. 5A, 5B, 5C are cross-sectional views of a step plate and a clamp plate which are taken along the center lines of FIGS. 2A, 3A, 4A, respectively;

FIGS. 8A and 8B are perspective views showing an R cam plate and an L cam plate of FIGS. 1B and 5A.

PREFERRED EMBODIMENTS FOR IMPLEMENTING THE INVENTION

Preferred embodiments according to the present invention will be described hereunder with reference to the accompanying drawings.

Figures 1A, 1B:
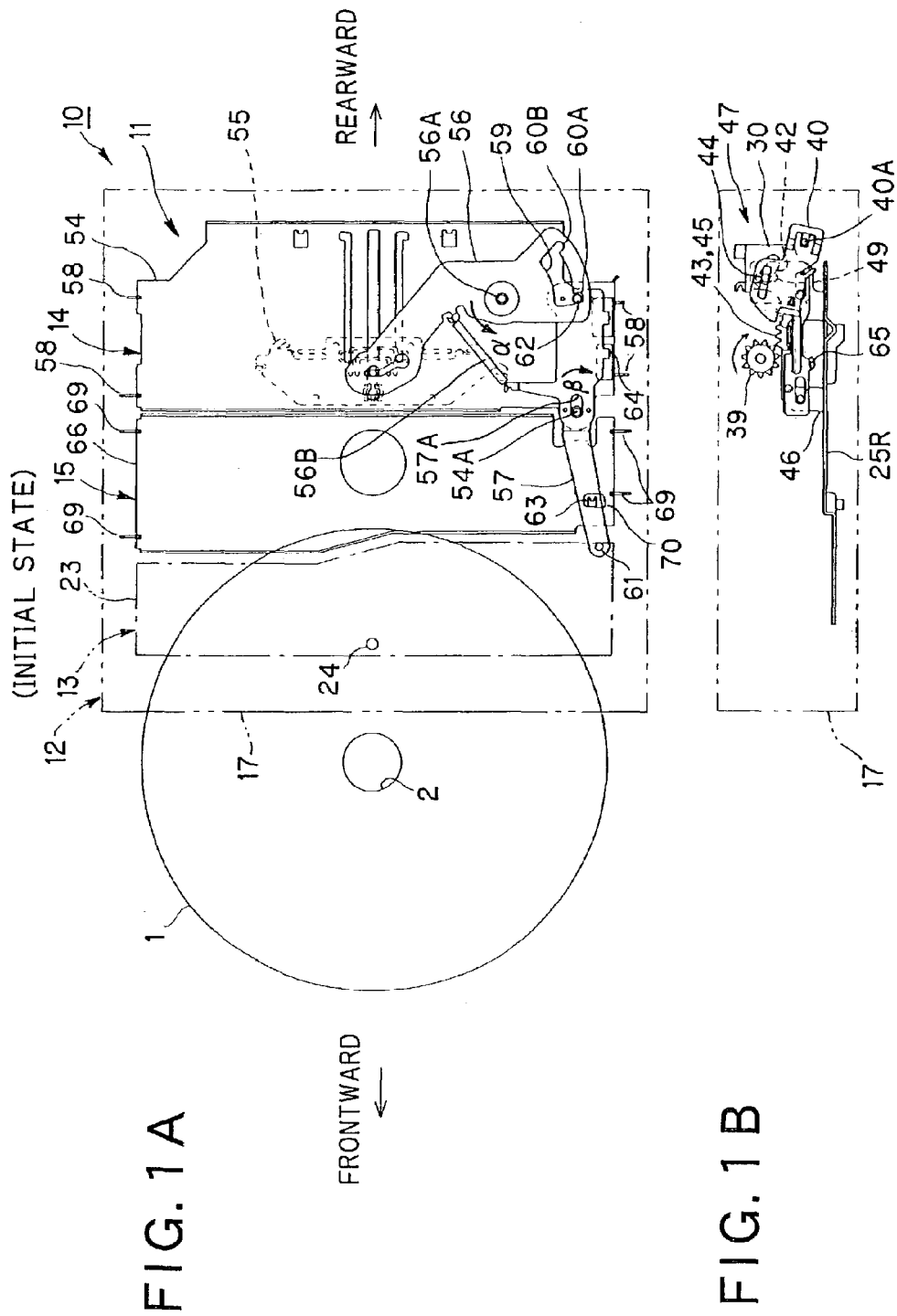
FIG. 1A is a plan view showing the initial state of a disc player when a disc stopper is located at an initial position in an embodiment of a disc player according to the present invention.
FIG. 1B is a plan view showing a trigger rack, an S arm stopper, etc. of FIG. 1A.

A disc player shown in FIG. 1A serves to reproduce information recorded on a recording medium disc 1 such as CD (compact disc), DVD (digital versatile disc) or the like, and comprises a player body 11 and a chassis unit 12. Further the player body 11 comprises a loading unit 13, a positioning unit 14, a damper unit 15 and a drive unit 16 as shown in FIG. 5A.

The chassis unit 12 has a vibration cushion structure having a damper and a spring (not shown) equipped to a chassis 17, and the player body 11 can be supported on the chassis 17 under a floating state through the vibration cushion structure.

Figure 6:
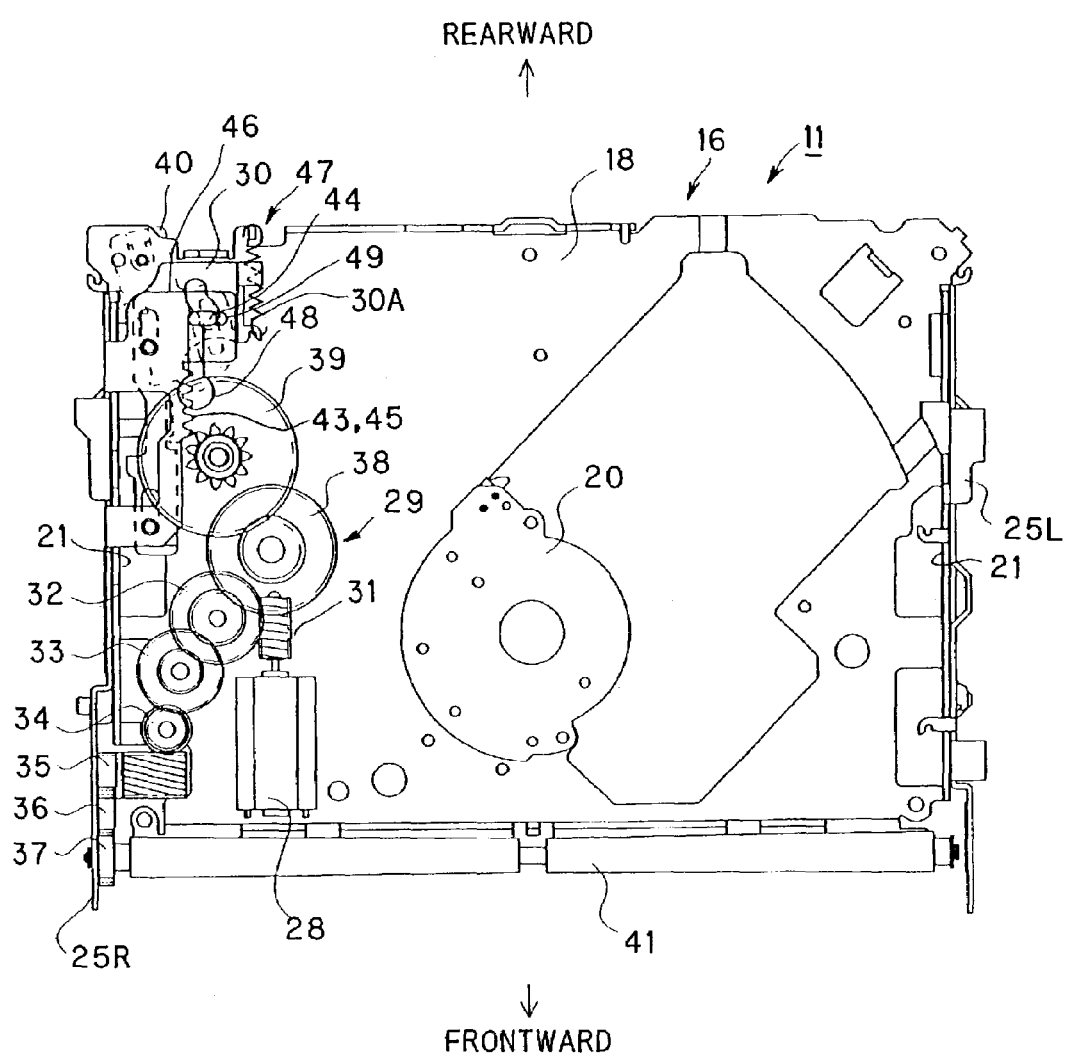
FIG. 6 is a back side view showing the main body of the player in the disc player of FIG. 1A.

As shown in FIGS. 5A and 6, in the drive unit 16 of the player body 11, the turntable 19 is disposed at the center of the surface of the drive plate 18 while a spindle motor 20 is disposed at the center of the back surface, and the spindle motor 20 rotates the turntable 19. Further, a pickup (not shown) is disposed on the drive plate 18 to pick up and reproduce information from the disc 1 which is clamped on the turntable 19 and rotated as described later.

Side walls 21 are integrally formed at both the right and left sides of the drive unit 16, and longitudinal grooves 22 (FIG. 5A) extending in the up-and-down direction (the vertical direction to the drive plate 18) are formed in the side walls 21. Further, an upper plate 23 (FIG. 1A) is fixedly disposed at the front portion of the drive unit 16, and a disc sensor 24 for detecting the disc inserted by a user is fixed to the upper plate 23.

As shown in FIGS. 5A to 5C and FIG. 6, an R cam plate 25R and an L cam plate 25L are disposed at both the side walls 21 of the drive unit 16 so as to be movable in parallel to the drive plate 18 in the front-and-rearward direction of the disc player 10. Further, cam grooves 26A, 26B and 26C are obliquely formed in the R cam plate 25R and the L cam plate 25L as shown in FIGS. 5A to 5C and FIGS. 8A and 8B.

The R cam plate 25R and the L cam plate 25L are linked to each other by a cranked crank shaft 27 and a loading plate (described later). The movement in the front-and-rearward direction of the R cam plate 25R is transmitted to the L cam plate 25L by the crank shaft 27, and the L cam plate 25L and the R cam plate 25R are synchronously movable.

As shown in FIG. 6, a loading motor 28, a gear wheel array 29 and a trigger rack 30 are disposed at the R cam plate 25R side on the back surface of the drive plate 18. Further, an S arm stopper 40 is disposed at the position corresponding to the trigger rack 30 on the surface of the drive plate 18.

The trigger rack 30 is equipped movably in the front-and-rearward direction of the disc player 10, and urged backwardly at all times by an extension spring 30A suspended between the trigger rack 30 and the drive plate 18. As shown in FIGS. 9A to 9D, the trigger rack 30 is equipped with a trigger groove 42 and a rack 43 which are inclined with respect to this moving direction. By fitting an elongated hole of the S arm stopper 40 into a pin 40A (FIG. 1B) implanted on the drive unit 16, the S arm stopper 40 is movable in the front-and-rearward direction of the disc player 10 and rotatable. Further, the S arm stopper 40 is equipped with a lock pin 44.

The gear wheel array 29 of FIG. 6 comprises a first gear 31 coupled to the shaft of the loading motor 28, a second gear 32 engaged with the first gear 31, third to seventh gears 33, 34, 35, 36 and 37 which are mutually engageable with one another, and an idle gear 38 and a final gear 39 which are mutually engageable with each other. The second gear 32 is engaged with the third gear 33 and the idle gear 38.

The seventh gear 37 is coupled to a loading roller 41 described later. The final gear 39 is designed to be engageable with a rack 43 of the trigger rack 30 and a rack 45 of the R cam plate 25R as shown in FIGS. 6, 9A to 9D. The rack 45 is formed in a driving piece 46 extending to the back surface side of the drive plate 18 at the R cam plate 25R.

The rack 45 of the R cam plate 25R is designed so as not to be unnecessarily engaged with the final gear 39 by the lock operation of the lock mechanism 47.

Figure 9A:
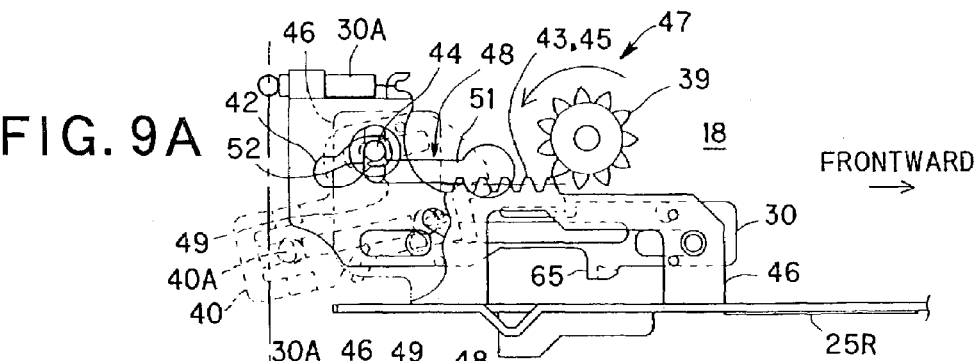
FIGS. 9A to 9D are operating diagrams showing the lock release operation of a lock mechanism of the R cam plate of FIG. 6.

That is, as shown in FIG. 9A, the lock mechanism 47 includes a key-shaped hole 48 formed in the drive plate 18, an elongated hole 49 formed in the driving piece 46 of the R cam plate 25R, the trigger groove 42 of the above trigger rack 30, and the lock pin 44 of the S arm stopper. The key-shaped hole 48 has a first hole 51 extending in the front-and-rearward direction of the drive plate 18, and a second hole 52 perpendicular to the first hole 51. The elongated hole 49 extends in parallel to the second hole 52. The lock pin 44 is fitted in the key-shaped hole 48, the elongated hole 49 and the trigger groove 42.

Under the state that no disc 1 is inserted in the player body 11 of the disc player 10, the lock pin 44 is fitted in the second hole 52 of the key-shaped hole 48 as shown in FIG. 9A, and thus the R cam plate 25R is prevented from moving in the front-and-rearward direction of the disc player 10. Accordingly, even when unexpected impact such as dropping impact or the like acts on the player body 11, the final gear 39 is prevented from being engaged with the rack 45 of the R cam plate 25R.

The release of the lock operation of the lock mechanism 47 described above is carried out as follows.

Figure 9B:
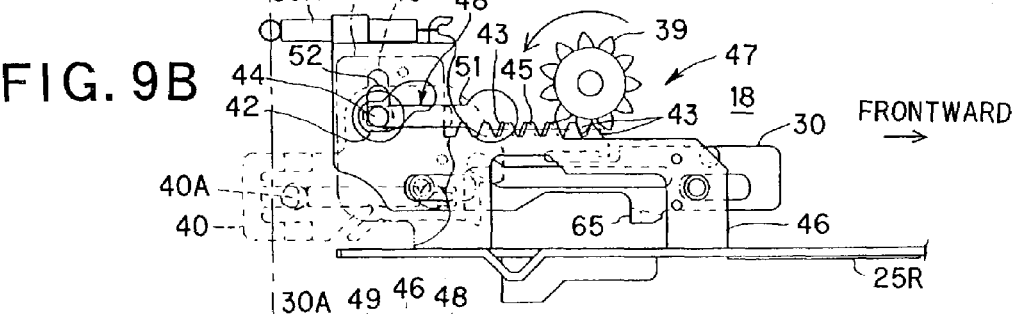
Figure 9C:
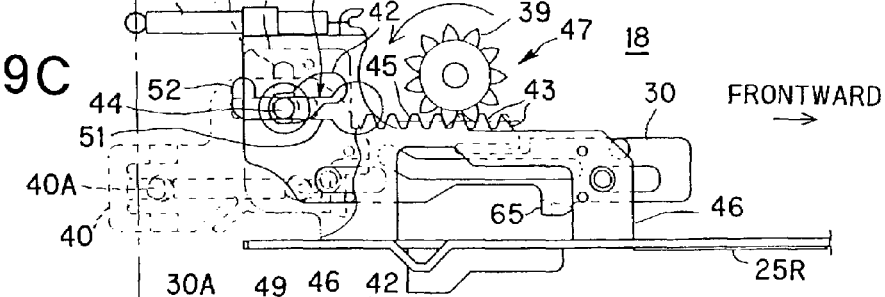
Figure 9D:
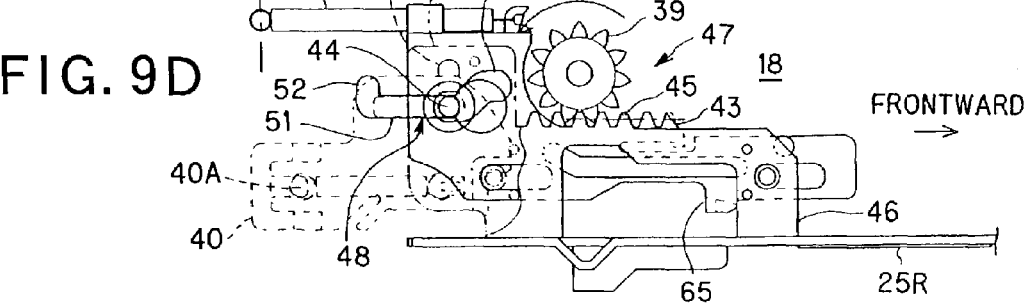

When the trigger rack 30 is pushed in the frontward direction of the disc player 10 by a sensor arm 57 described later and moved forwardly against the urging force of the extension spring coil 30A, the rack 43 of the trigger rack 30 is engaged with the final gear 39 and the trigger rack 30 is further moved in the frontward direction of the disc player 10 by the driving force of the loading motor 28 as shown in FIG. 9B. At this time, the trigger groove 42 of the trigger rack 30 moves the lock pin 44 from the second hole 52 of the key-shaped hole 48 to the first hole 51 side, whereby the lock operation of the lock mechanism 47 is released. Therefore, the trigger rack 30 further pushes the R cam plate 25R through the lock pin 44, whereby the rack 45 of the R cam plate 25R is engaged with the final gear 39 as shown in FIG. 9C and the R cam plate 25R is moved in the frontward direction of the disc player 10 (FIG. 9D). At this time, the lock pin 44 is moved in the first hole 51 of the key-shaped hole 48.

As shown in FIGS. 5A to 5C and FIG. 6, the loading unit 13 comprises the loading roller 41 and a loading plate (not shown). The loading plate is pivotally supported by the upper plate 23 (FIG. 1A), and the shaft of the loading roller 42 is rotatably supported by the loading plate. The shaft of the loading roller 41 is fitted in the cam groove 26A of the R cam plate 25R at one end thereof, and also fitted in the elongated hole formed in the side wall 21 of the drive plate 18 at the other end thereof.

The loading plate presses the loading roller 41 against the disc 1 by the spring force. The driving force of the loading motor 28 of FIG. 6 is transmitted to the loading roller 41 through the first gear 31 to the seventh gear 37 of the gear wheel array 29. Accordingly, when the disc sensor 24 detects the disc 1 and actuates the loading motor 28, the loading roller 41 is rotated to draw the disc 1 into the player body 11.

As shown in FIG. 5C, when the R cam plate 25R and the L cam plate 25L are moved in the frontward direction of the disc player 10, the shaft of the loading roller 41 is separated from the disc 1, and the disc drawing and feeding operation is stopped. At this time, the loading plate rotates around a predetermined pivot point (not shown), and the abutting between the loading plate and the projection (not shown) of the chassis 17 is released, so that the player body 11 is supported by the chassis 17 under the floating state.

As shown in FIGS. 1A and 5A, the positioning unit 14 comprises a step plate 54, a disc stopper 55, a G plate 56 and a sensor arm 57, and it performs the positioning of the disc 1 so that the center of the center hole 2 in a large-diameter or small-diameter disc 1 (that is, the center of the disc 1) is coincident with the center of the turntable 19 (FIGS. 5A to 5C).

Figure 7:
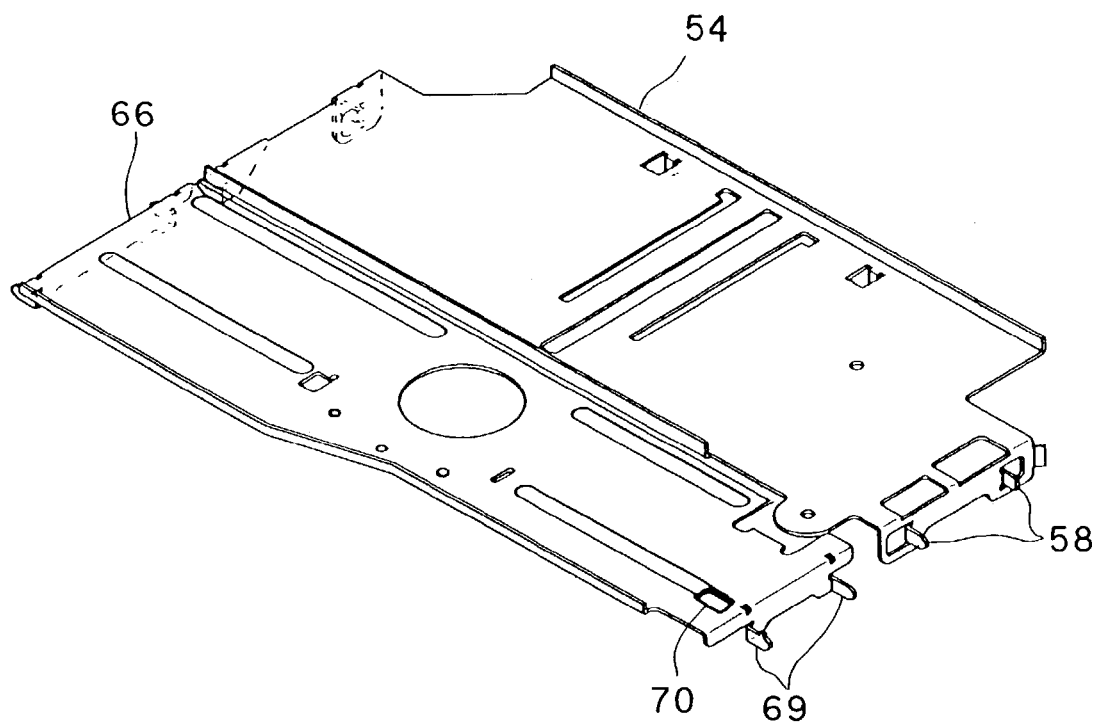
FIG. 7 is a perspective view showing the step plate and the clamp plate of FIG. 1A.

Fitting pawls 58 are disposed at both the right and left sides of the disc player 10 in the step plate 54. As shown in FIG. 7, the fitting pawls 58 are formed by bending up them in the molding process of the step plate 54. The fitting pawls 58 are fitted in the longitudinal groove 22 in the side wall 21 of the drive plate 18 and the cam grooves 26B of the R cam plate 25R and the L cam plate 25L. Accordingly, when the R cam plate 25R and the L cam plate 25L are moved in the front-and-rearward direction of the disc player 10, the fitting pawls 58 are movable in the vertical direction, that is, upwardly and downwardly movable with respect to the drive plate 18 along the longitudinal grooves 22 of the drive plate 18.

Through the downward movement of the step plate 54, a vibration cushion stroke L is ensured between the positioning unit 14 and the chassis 17. Further, through the upward movement of the step plate 54, the disc 1 can be drawn into the player body beyond the turntable 19 of the drive unit 16.

As shown in FIG. 5A, the disc stopper 55 is designed to be U-shaped in section so that the disc 1 drawn into the player body 11 can be accommodated therein. Further, as shown in FIG. 1A, the disc stopper 55 is equipped so as to be fitted to the step plate 54 and movable in the front-and-rearward direction of the disc player 10, and positions the disc 1 which is drawn and fed into the player body 11 by the loading roller 41.

By the function of the G plate and the sensor arm 57 described later, the disc stopper 55 is positioned from the initial position shown in FIG. 1A to the positioning position shown in FIGS. 2A and 3A at which the center of the center hole 2 of the disc 1 is made coincident with the center of the turntable 19, or the retracted position shown in FIG. 4A at which the disc stopper 55 is spaced from the disc 1 clamped and chucked to the turntable 19.

The G plate 56 is rotatably supported on the pin 56A implanted on the step plate 54, and a disc stopper 55 is fixed to one end portion thereof. An opening 59 is equipped to the other end portion of the G plate 56, and an A hole 60A and a B hole 60B are formed in the opening 59.

The sensor arm 57 is rotatably pivotally supported on the step plate 54 so as to be minutely movable in the front-and-rearward direction of the disc player 10. That is, the elongated hole 57A formed in the sensor arm 57 is fitted in the pin 54A implanted on the step plate 54. An arm rod 61 is implanted at the tip portion of the sensor arm 57, and a boss 62 is formed at the other end portion. The boss 62 is positioned in the opening 59 of the G plate 56. Further, a stop pawl 63 which is engagedly fitted in a stop groove 70 of a clamp plate 66 described later is formed in the neighborhood of the arm rod 61 of the sensor arm 57.

The G plate 56 and the sensor arm 57 are urged in the counterclockwise direction α and in the clockwise β direction respectively by an extension coil spring 56B suspended therebetween.

When a small-diameter disc 1 (for example, 8 cm CD) is drawn into the player body 11, the arm rod 61 may abut against the disc 1 concerned in accordance with the insertion position of the disc 1. However, eve when the arm rod 61 abuts against the disc 1, the abutting is released during the process that the disc 1 is drawn and centered. Accordingly, in this case, the stop pawl 63 is fitted in the stop groove 70 under the state that the boss 62 of the sensor arm 57 is kept fitted in the A hole 60A of the G plate 56, whereby the rotation of the G plate 56 is prevented and the disc stopper 55 is positioned to the positioning position of the small-diameter disc 1.

When a large-diameter disc 1 (for example, 12 cm CD) is drawn into the player body 11, the disc 1 abuts against the arm rod 61 of the sensor arm 57, and the sensor arm 57 is rotated outwardly through the drawing operation of the disc 1, whereby the engagement between the boss 62 of the sensor arm 57 and the A hole 60A of the G plate 56 is released. The disc 1 presses the disc stopper 55 in the rearward direction of the disc player 10 against the tense force of the extension coil spring 56B to rotate the G plate 56, and the boss 62 of the sensor arm 57 is moved in the rearward direction of the disc player 10 in the opening 59 of the G plate 56.

As described above, when the disc 1 is moved in the rearward direction of the disc player 10, the disc 1 is separated from the arm rod 61 of the sensor arm 57, whereby the boss 62 of the sensor arm 57 is fitted into the B hole 60B of the G plate 56 by the tension force of the extension coil spring 56B. When the disc 1 is further moved in the rearward direction of the disc player 10, the G plate 56 is minutely rotated against the tension force of the extension coil spring 56B, and this rotation force moves the sensor arm 57 in the frontward direction of the disc player 10 through the boss 62. At the stage that the stop pawl 63 of the sensor arm 57 is fixedly fitted in the stop groove of the clamp plate 66 during the movement of the sensor arm 57, the rotation of the G plate 56 is stopped, and as shown in FIG. 2A, the disc stopper 55 is positioned to the positioning position for the large-diameter disc 1.

Actually, by the drawing operation of the disc 1 from the stage that the boss 62 of the sensor arm 57 is fitted in the B hole 60B of the G plate 56, the G plate 56 is further minutely rotated and the sensor arm 57 is minutely moved in the frontward direction of the disc player 10, whereby a sensor arm press pawl 64 of the sensor arm 57 presses a trigger rack press receiving portion 65 of the trigger rack 30 to minutely move the trigger rack 30 in the frontward direction of the disc player 10, which gives a trigger for the engagement between the rack 43 of the trigger rack 30 and the final gear 39.

As shown in FIG. 1A and FIGS. 5A to 5C, the damper unit 15 is equipped with a clamp plate 66, a clamp ring 67 and a damp spring 68, and serves to damp the disc positioned by the positioning unit 14 onto the turn table 19 of the drive unit 16.

As shown in FIG. 7, the damp plate 66 is a separate body from the step plate 54 of the positioning unit 14, and fitting pawls 69 are disposed at both the sides in the right-and-left direction of the disc player 10 on the clamp plate 66 as in the case of the step plate 54. The fitting pawls are formed erectly from the clamp plate 66 when the clap plate 66 is molded from sheet metal. As shown in FIGS. 5A to 5C, the fitting pawls 69 are fitted in the longitudinal grooves 22 of the side walls 21 of the drive plate 18 and also in the cam grooves 26C of the R cam plate 25R and the L cam plate 25L (see FIGS. 8A and 8B). Accordingly, when the R cam plate 25R and the L cam plate 25L are moved in the front-and-rearward direction of the disc player 10, the fitting pawls 69 are movable in the vertical direction, that is, upwardly and downwardly movable with respect to the drive plate 18 along the longitudinal grooves 22 of the drive plate 18.

The upward/downward movement of the clamp plate 66 is performed in synchronism with the step plate 54 of the positioning unit 14, and the its stroke is set to a stroke M larger than the upward/downward movement stroke (that is, the vibration cushion stroke L) of the step plate 54. For example, the upward/downward movement stroke of the step plate 54 is set to 2.5 mm, and the upward/downward movement stroke of the damp plate 66 is set to 4.5 mm.

The stroke M of the clamp plate 66 is set on the basis of the following standards.

That is, the disc 1 can be drawn into the drive unit 16 beyond the turntable 19 of the drive unit 16 at the uppermost movement position of the clamp plate 66 (FIG. 5A). Further, the sufficient vibration cushion stroke L can be kept between the damper unit 15 and the chassis 17 at the lowermost movement position of the clamp plate 66 (FIG. 5C), and also a clearance T is set between the clamp ring 67 and the damp plate 66 when the clamp ring 67 clamps the disc 1 onto the turntable 19.

The damp ring 67 is disposed freely rotatably with respect to the clam plate 66. The clamp ring 67 is pressed against the clamp plate 66 by the spring force of the clamp spring 68, however, it is separated from the clam plate 66 to set the clearance T as described above when the clamp plate 66 is downwardly moved to the lowermost movement position to damp the disc 1 onto the turntable 19. When the disc 1 is clamped by the damp ring 67, the spring force of the clamp spring 68 and the attracting force of magnet 71 contained in the turntable 19 act on the clamp ring 67, and the disc 1 is clamped onto the turntable 19 by these force.

Next, a series of operations until the recording/reproduction of the disc player 10 thus constructed is carried out will be described along the following steps (1) to (4).

(1) As shown in FIG. 1A, when the disc 1 is inserted and the disc sensor 24 detects the disc 1 concerned, the loading motor 28 is actuated to rotate the loading roller 41 and draw and feed the disc 1 into the player body 11. At this time the disc stopper 55 is located at the initial position.

(2) The disc 1 drawn into the player body 11 abuts against the disc stopper 55 and is horizontally moved in the front-and-rearward direction. At this time when the disc 1 is a large-diameter 12 cm CD, the sensor arm 57 is rotated, and the boss 62 of the sensor arm 57 is disengaged from the A hole 60A of the G plate 56, so that the disc stopper 55 is movable to the positioning position for the 12 cm CD.

Figures 2A, 2B:
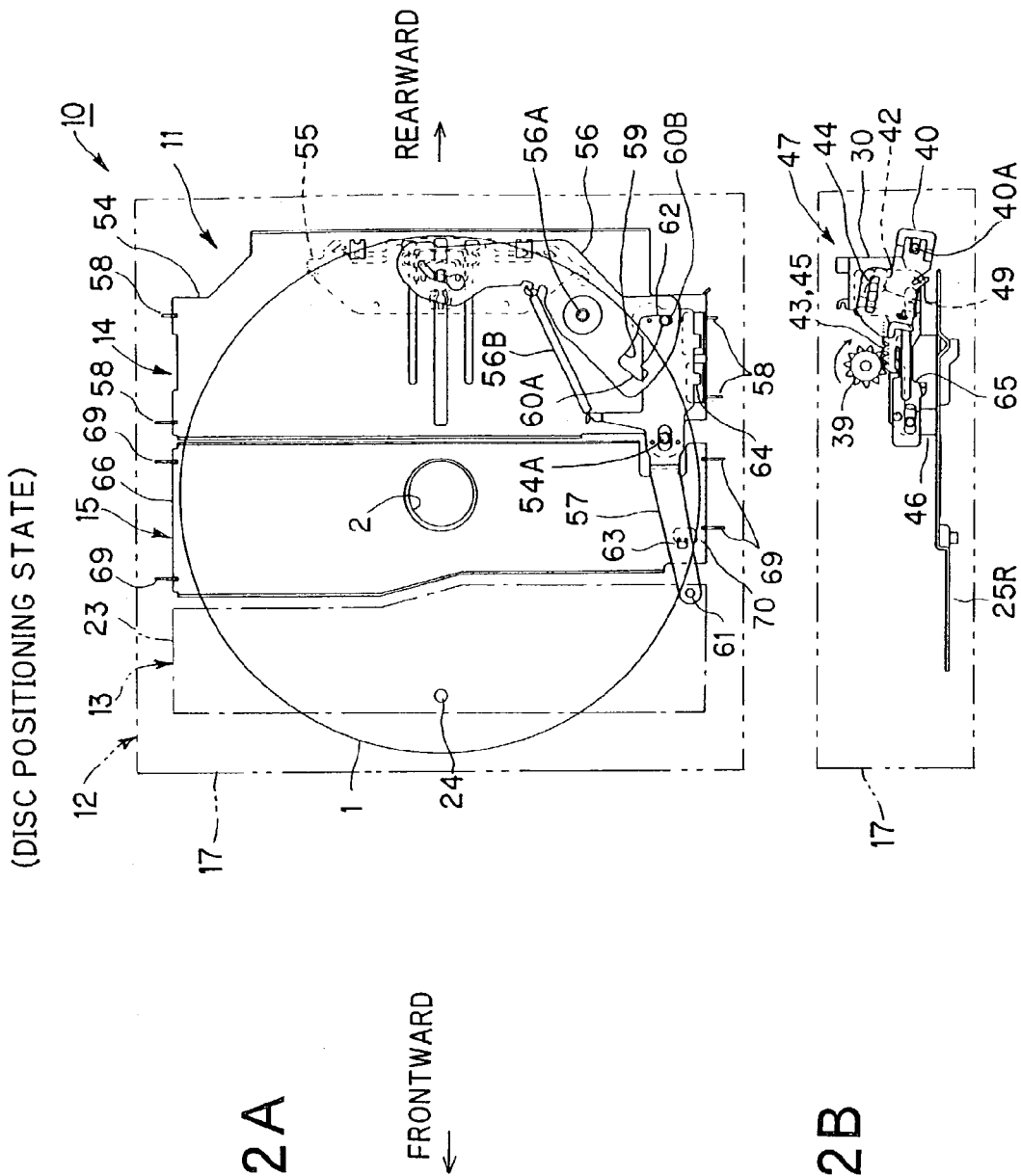
FIG. 2A is a plan view showing the disc positioning state of the disc player when the disc stopper is located at the positioning position in the disc player of FIG. 1A.
FIG. 2B is a plan view showing the trigger rack, the S arm stopper, etc. of FIG. 2A.

As shown in FIG. 2A, when the disc stopper 55 is moved to the positioning position for the 12 cm CD, the disc 1 gets out of the arm rod 61 of the sensor arm 57 and the sensor arm 57 is rotated in the clockwise direction β by the tension force of the spring 56B, so that the boss 62 of the sensor arm 57 is fitted in the B hole 60B of the G plate 56. The disc 1 is further drawn by the loading roller 41, whereby the sensor arm 57 is horizontally moved in the frontward direction of the disc player 10 until the stop pawl 63 of the sensor arm 57 is fixedly fitted in the stop groove 70 of the clamp plate 66. At this time, the disc stopper 55 is positioned to the positioning position.

(3) As shown in FIG. 9A, by the forward movement of the sensor arm 57 as described above, the sensor arm press pawl 64 (FIG. 2A) of the sensor arm 57 presses the trigger rack press receiving portion 65 of the trigger rack 30 (FIG. 2B) so that the trigger rack 30 is forwardly moved against the urging force of the extension coil spring 30A and the rack 43 of the trigger rack 30 is engaged with the final gear 39.

Figures 3A, 3B:
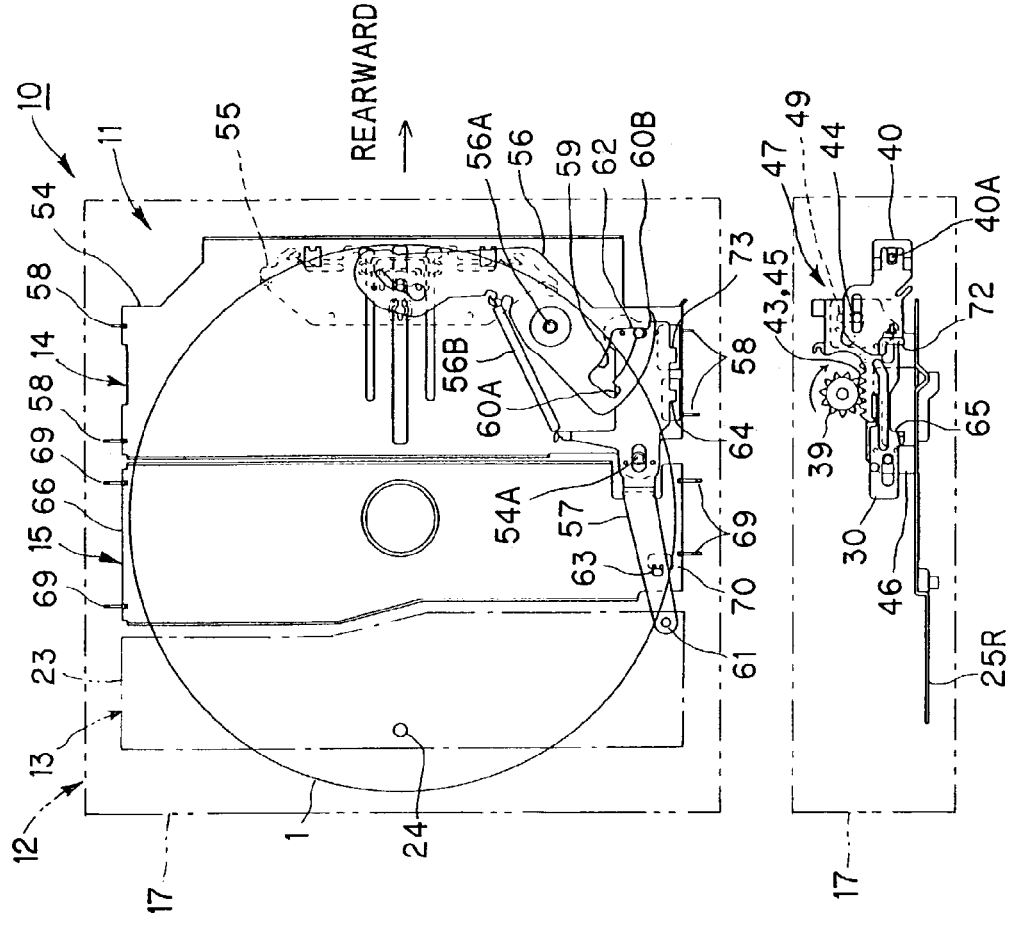
FIG. 3A is a plan view showing the disc chucking state of the disc player when the disc stopper is located at the positioning position in the disc player of FIG. 1A.
FIG. 3B is a plan view showing the trigger rack, the S arm stopper, etc. of FIG. 3A.

As shown in FIGS. 3A and 3B and FIG. 9B, when the rack 43 of the trigger rack 30 and the final gear 39 are engaged with each other, the trigger rack 30 achieves the driving force of the loading motor 28 to be further horizontally moved in the frontward direction of the disc player 10, and the lock pin 44 of the S arm stopper 40 gets out of the second hole 52 of the key-shaped hole 48, whereby the lock operation of the lock mechanism 47 is released. At this time, the S arm stopper 40 is rotated and enters the locus of the moved sensor arm 57 to prevent returning of the sensor arm 57.

As shown in FIG. 9C, when the trigger rack 30 progresses and the rack 43 of the trigger rack 30 and the rack 45 of the R cam plate 25R are coincident with each other in phase, the trigger groove 42 of the trigger rack 30 pushes the driving piece 66 through the lock pin 44 and the elongated hole 49, the rack 45 is engaged with the final gear 39 while the rack 43 and the rack 45 are coincident with each other in phase, and the R cam plate 25R is horizontally moved in the frontward direction of the disc player 10 together with the trigger rack 30. The horizontal movement of the R cam plate 25R is transmitted to the L cam plate 25L by the crank shaft 27 and the loading plate shown in FIGS. 5A to 5C and FIGS. 8A and 8B, and the R cam plate 25R and the L cam plate 25L are horizontally moved in synchronism with each other.

As shown in FIG. 5B, when the R cam plate 25R and the L cam plate 25L are moved in the frontward direction of the disc player 10, the step plate 54 and the clamp plate 66 are downwardly moved by the action of the cam grooves 26B and 26C of the R cam plate 25R and the L cam plate 25L. Likewise, the loading arm (not shown) is rotated by the action of the cam groove 26A, and the loading roller 41 is separated from the disc 1.

As shown in FIG. 5C, when the step plate 54 and the clamp plate 66 are downwardly moved to the lowermost movement position, the clamp ring 67 clamps the disc 1 onto the turntable 19 by the urging force of the clamp spring 68 and the attraction force of the magnet 71. As described above, when the clamp ring 67 clamps the disc 1 onto the turntable 19, the disc stopper 55 is positioned to the positioning position.

(4) When the step plate 54 and the clamp plate 66 are downwardly moved to the lowermost movement position, the engagement between the stop pawl 63 of the sensor arm 57 shown in FIG. 3A and the stop groove 70 of the clamp plate 66 is released.

Figures 4A, 4B:
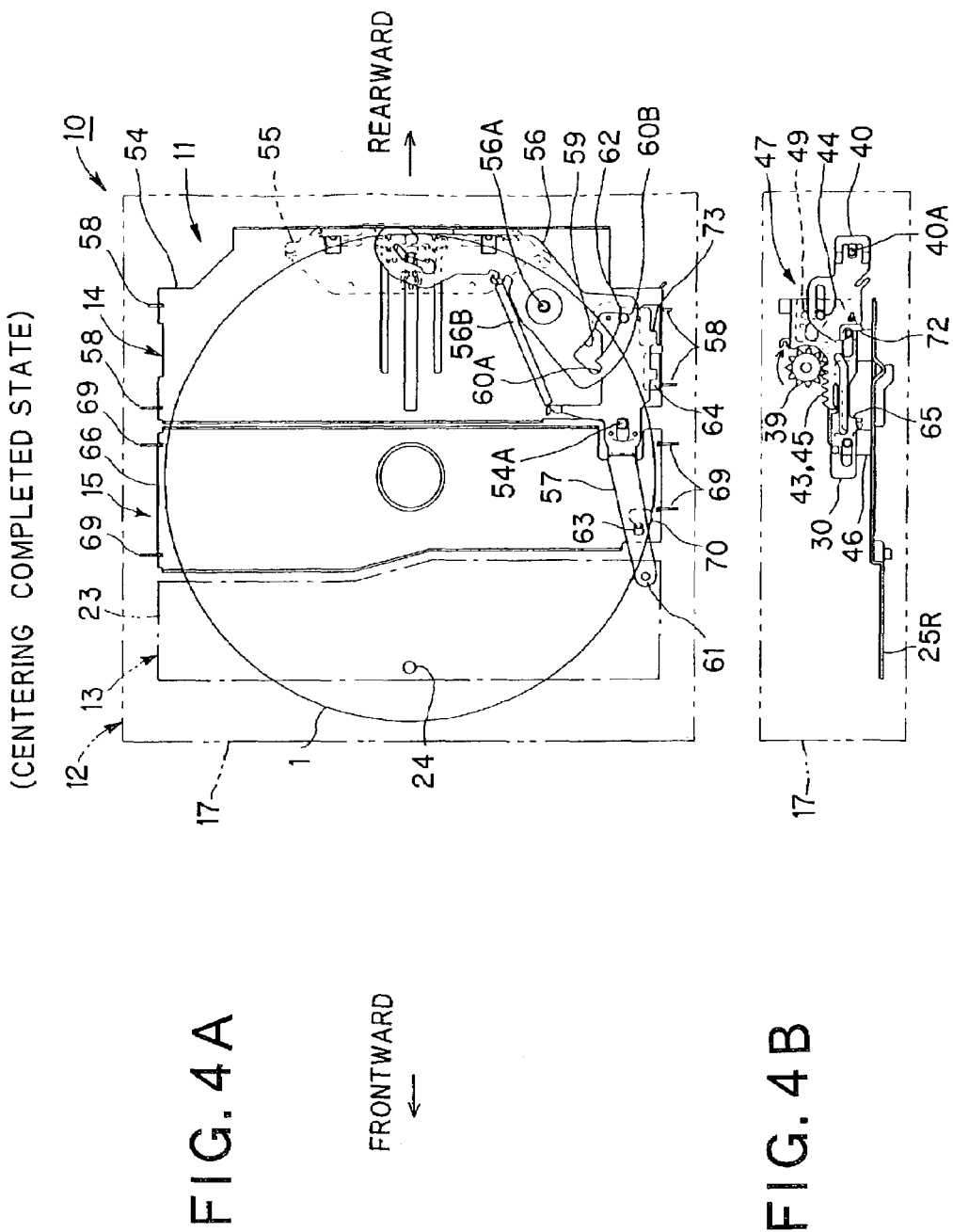
FIG. 4A is a plan view showing the centering completed state of the disc player when the disc stopper is located at a retracted position in the disc player of FIG. 1A.
FIG. 4B is a plan view showing the trigger rack, the S arm stopper, etc. of FIG. 4A.

As shown in FIGS. 4A and 9D, the rotating force of the loading motor 28 is transmitted to the R cam plate 25R through the final gear 39 and the rack 45 of the R cam plate 25R, and the R cam plate 25 and the L cam plate 25L are moved in the frontward direction of the disc player 10. The lock pin 44 pushes the arm stopper 40 in the neighborhood of the forefront position of the R cam plate 25R to move the S arm stopper 40 in the frontward direction of the R cam plate 25R.

Accordingly, the S arm stopper press portion 72 of the S arm stopper 40 shown in FIG. 4B presses the sensor arm press receiving portion 73 of the sensor arm 57 in the frontward direction of the disc player 10. At this time, since the stop pawl 63 of the sensor arm 57 is out of the stop groove 70 of the clamp plate 66, the sensor arm 57 is further minutely moved in the frontward direction of the disc player 10, and the G plate 56 is rotated, so that the disc stopper 55 is forcedly separated from the disc 1. As a result, the disc 1 is rotatable without coming into contact with the disc stopper 55.

In the description (2) of the operation of the disc player 10 as described above, when the disc 1s a small-diameter 8 cm CD, the boss 62 of the sensor arm 57 is fitted and held in the A hole 60A of the G plate 56. Under this state, the small-diameter disc 1 is drawn in by the loading roller 41, and the sensor arm 57 is horizontally moved in the frontward direction of the disc player 10 until the stop pawl 63 of the sensor arm 57 is fixed in the stop groove 70 of the clamp plate 66, so that the disc stopper 55 is positioned to the positioning position. With respect to the subsequent operation, the same operations as the descriptions (3) and (4) are carried out.

Accordingly, according to the above embodiment, the following effects (1) and (2) can be achieved.

(1) The disc stopper 55 for regulating the movement of the drawn disc 1 is positioned to the positioning position at which the disc 1 and the turntable 19 are concentrically disposed and to the retracted position at which the disc stopper 55 is spaced from the disc 1 which is clamped and chucked onto the turntable 19 by using the clamp ring 67, so that the centering precision of the disc 1 on the turntable 19 can be enhanced by clamping and chucking the disc 1 on the turntable 19 at the positioning position of the disc stopper 55.

(2) The disc 1 is clamped and chucked onto the turntable 19 at the positioning position of the disc stopper 55, so that there can be shortened the height dimension of the taper which is formed in the height direction of the turntable 19, can be fitted in the center hole 2 of the disc 1 and makes the center of the disc and the center of the turntable 19 coincident with each other in the fitting process. As a result, the height of the turntable 19 can be reduced, and thus the disc player 10 can be reduced in thickness.

INDUSTRIAL UTILITY

As described above, according to the present invention, the disc stopper for regulating the movement of the drawn disc is positioned to the positioning position at which the center of the disc and the center of the turntable are made coincident with each other and also to the retracted position at which the disc stopper is spaced from the disc clamped and chucked on the turntable. Therefore, the present invention can be applied to not only a disc player dedicated to reproduction, but also a disc player which can record and reproduce information.

What is claimed is:

1. A disc player comprising:
   a drawn disc;
   a turntable;
   a device for clamping and chucking said disc onto said turntable;
   a motor for generating a driving force;
   a disc stopper for regulating a movement of the disc, said disc stopper is designed so as to be positioned to a positioning position where the disc and said turntable are positioned to be concentric with each other and to a retracted position when said disc stopper is spaced from the disc clamped and chucked to said turntable;
   a sensor arm for receiving said driving force from said motor and transmitting said driving force to position the disc stopper to the retracted position after the disc is clamped onto said turntable.

2. The disc player as claimed in claim 1, wherein said driving force forcedly moves said disc stopper from the positioning position to the retracted position after the disc is clamped and chucked to said turntable.

3. The disc player as claimed in claim 1, wherein said disc stopper is mounted at one end of a rotatable G plate, the other end of said G plate is fitted to said sensor arm which is varied in an engaging position in accordance with each of plural kinds of discs different in diameter, and after the disc is clamped and chucked into said turntable at the positioning position of said disc stopper, said G plate is minutely rotated by a minute movement of said sensor arm to position said disc stopper to the refracted position.

4. A disc player in which a disc stopper for regulating a movement of a drawn disc is moved to clamp and chuck a disc on a turntable, characterized in that said disc stopper is designed so as to be positioned to a positioning position where the disc and said turntable are positioned to be concentric with each other and to a retracted position where said disc stopper is spaced from the disc clamped and chucked to said turntable, wherein a sensor arm transmits a force to position the disc stopper tote retracted position after the disc is clamped onto said turntable, wherein said disc stopper is mounted at one end of a rotatable G plate, the other end of said G plate is fitted to said sensor arm which is varied in an engaging position in accordance with each of plural kinds of discs different in diameter, and after the disc is clamped and chucked into said turntable at the positioning position of said disc stopper, said G plate is minutely rotated by a minute movement of said sensor arm to position said disc stopper to the retracted position, and wherein the movement of said disc stopper due to a drawing of the disc and a clamping of the disc onto said turntable are performed by the driving force of a motor, and the driving force of said motor is transmitted to said sensor arm after the disc is clamped onto said turntable, so that said sensor arm is minutely moved.

5. A disc player comprising:
   a turntable;
   a disc stopper movable to a first position where a first disc is concentrically positioned with the turntable and to a first retracted position where the disc stopper is spaced from the first disc;
   a sensor arm that moves the disc stopper from the first position to the first retracted position; and
   a motor providing a driving force to said sensor arm after the first disc is clamped onto said turntable to move said disc stopper to said first retracted position.

6. The disc player of claim 5, wherein the disc stopper is further movable to a second position to position a second disc concentrically with the turntable and to a second retracted position where the disc stopper is spaced from the second disc, and wherein the first disc has a larger diameter than the second disc.

7. The disc player of claim 6, further comprising:
   a rotatable G plate on which the disc stopper is mounted; and
   a loading roller that feeds a disc in a feeding direction.

8. The disc player of claim 7, wherein the sensor arm comprises a boss engaging an opening in the rotatable G plate.

9. The disc player of claim 8, further comprising a spring that rotatably biases the boss toward a first position in the opening in the rotatable G plate.

10. The disc player of claim 9, wherein the opening in the rotatable G plate further comprises a second position for the boss, and wherein the first position corresponds to the second disc and the second position corresponds to the first disc.

11. The disc player of claim 9, wherein the sensor arm comprises an arm rod that rotates the sensor arm to move the boss out of the first position in response to contact with a periphery of the first disc.

12. The disc player of claim 9, wherein the loading roller feeds the disc into contact with the disc stopper.

13. The disc player of claim 12, wherein the loading roller further feeds the disc to force the disc stopper in a feeding direction to rotate the G plate.

14. The disc player of claim 13, wherein rotation of the G plate positions the boss of the sensor arm at the second position.

15. The disc player of claim 13, further comprising a clamper unit that clamps a disc to the turntable.

16. The disc player of claim 15, wherein rotation of the G plate moves a stop of the sensor arm that engages a stop pawl groove in the clamper unit to concentrically position the clamper unit with respect to the turntable.

17. A disc player comprising:
a turntable;
a disc stopper selectively moveable between a first positioning position where a first disc and the turntable are positioned to be concentric with each other, a second positioning position where a second disc and the turntable are positioned to be concentric with each other, and a retracted position where the disc stopper is spaced from the first disc when the first disc is clamped and chucked to said turntable, wherein the first disc has a larger diameter than the second disc; and a sensor arm that receives a driving force from a motor after the first disc is clamped onto said turntable to move said disc stopper to said refracted position.

* * * * *